US010627887B2

(12) United States Patent
Tubbs et al.

(10) Patent No.: US 10,627,887 B2
(45) Date of Patent: Apr. 21, 2020

(54) FACE DETECTION CIRCUIT

(71) Applicant: Microsoft Technology Licensing, LLC, Redmond, WA (US)

(72) Inventors: Matthew R. Tubbs, Redmond, WA (US); Ryan Haraden, Duvall, WA (US); Rob Shearer, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 423 days.

(21) Appl. No.: 15/200,396

(22) Filed: Jul. 1, 2016

(65) Prior Publication Data
US 2018/0004275 A1 Jan. 4, 2018

(51) Int. Cl.
*G06F 1/3231* (2019.01)
*G06F 1/3287* (2019.01)
*G06K 9/00* (2006.01)
*H04N 5/232* (2006.01)
*G06F 1/3234* (2019.01)

(52) U.S. Cl.
CPC .......... *G06F 1/3231* (2013.01); *G06F 1/3243* (2013.01); *G06F 1/3287* (2013.01); *G06K 9/00255* (2013.01); *H04N 5/23219* (2013.01); *H04N 5/23229* (2013.01); *H04N 5/23241* (2013.01); *Y02D 10/152* (2018.01); *Y02D 10/171* (2018.01); *Y02D 10/173* (2018.01)

(58) Field of Classification Search
CPC ..... G06F 1/3231; G06F 1/3287; H04N 5/232; H04N 5/23241; H04N 5/23219; G06K 9/00255
See application file for complete search history.

(56) References Cited

U.S. PATENT DOCUMENTS

| 5,835,083 A | 11/1998 | Nielsen et al. |
| 6,111,517 A | 8/2000 | Atick et al. |
| 6,301,370 B1 | 10/2001 | Steffens et al. |
| 6,504,942 B1 | 1/2003 | Hong et al. |

(Continued)

FOREIGN PATENT DOCUMENTS

| CN | 104915007 A | 9/2015 |
| KR | 20130093962 A | 8/2013 |

OTHER PUBLICATIONS

"Dell FastAccess 3.0 Facial Recognition Software Frequently Asked Questions (FAQ)", Published on: Dec. 3, 2014 Available at: http://www.dell.com/support/article/us/en/19/SLN147279.

(Continued)

*Primary Examiner* — David N Werner
*Assistant Examiner* — Berteau Joisil
(74) *Attorney, Agent, or Firm* — Rainer Patents, P.S.

(57) ABSTRACT

This document relates to power consumption of computing devices. One example is a face detection circuit that includes a camera interface, a processing component, and a power management interface. The camera interface can be configured to communicate with a camera. The processing component can be configured to instruct the camera to provide image data at multiple levels of resolution, and perform multiple stages of analysis on the image data obtained from the camera to detect the presence of a face in the image data. The power management interface can be configured to output an indication when the face is detected in the image data.

23 Claims, 10 Drawing Sheets

(56) References Cited

U.S. PATENT DOCUMENTS

| | | | |
|---|---|---|---|
| 6,665,805 B1 * | 12/2003 | Tsirkel | G06F 1/3203 |
| | | | 713/323 |
| 6,675,210 B1 * | 1/2004 | Takeo | H04L 67/303 |
| | | | 709/203 |
| 7,406,612 B2 | 7/2008 | O'Connor et al. | |
| 8,135,167 B2 | 3/2012 | Lin | |
| 8,159,263 B1 * | 4/2012 | Tuan | H03K 19/018585 |
| | | | 326/38 |
| 8,326,001 B2 | 12/2012 | Free | |
| 8,885,943 B2 | 11/2014 | Irmatov et al. | |
| 8,976,110 B2 | 3/2015 | Eskilsson et al. | |
| 8,994,499 B2 | 3/2015 | Zhao et al. | |
| 8,995,715 B2 | 3/2015 | Sultana et al. | |
| 9,076,029 B2 | 7/2015 | Free | |
| 9,135,421 B2 | 9/2015 | Hanzawa et al. | |
| 9,268,993 B2 | 2/2016 | Wus et al. | |
| 2004/0175020 A1 * | 9/2004 | Bradski | G06F 1/3203 |
| | | | 382/103 |
| 2005/0063568 A1 | 3/2005 | Sun et al. | |
| 2006/0192775 A1 | 8/2006 | Nicholson et al. | |
| 2010/0205667 A1 | 8/2010 | Anderson et al. | |
| 2014/0075528 A1 | 3/2014 | Matsuoka | |
| 2014/0108842 A1 | 4/2014 | Frank et al. | |
| 2014/0125575 A1 | 5/2014 | Samanta Singhar | |
| 2014/0163978 A1 | 6/2014 | Basye et al. | |
| 2014/0267021 A1 | 9/2014 | Lee et al. | |
| 2015/0146915 A1 | 5/2015 | Peng et al. | |

OTHER PUBLICATIONS

Hong, K., "Object Detection: Face Detection using Haar Cascade Classfiers", Retrieved on: Mar. 22, 2016 Available at: http://www.bogotobogo.com/python/OpenCV_Python/python_opencv3_Image_Object_Detection_Face_Detection_Haar_Cascade_Classifiers.php.

Garcia, et al., "Convolutional Face Finder: A Neural Architecture for Fast and Robust Face Detection", In Proceedings of IEEE Transactions on Pattern Analysis and Machine Intelligence, vol. 26, No. 11, Nov. 2004, pp. 1408-1423.

Marciniak, et al., "Influence of low resolution of images on reliability of face detection and recognition", In Journal of Multimedia Tools and Applications, vol. 74, Issue 12, Jun. 2013, pp. 4329-4369.

\* cited by examiner

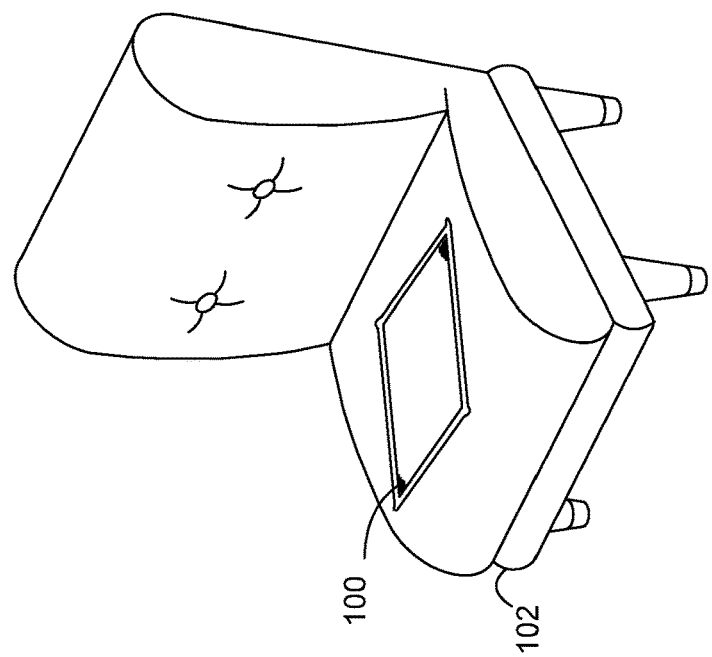
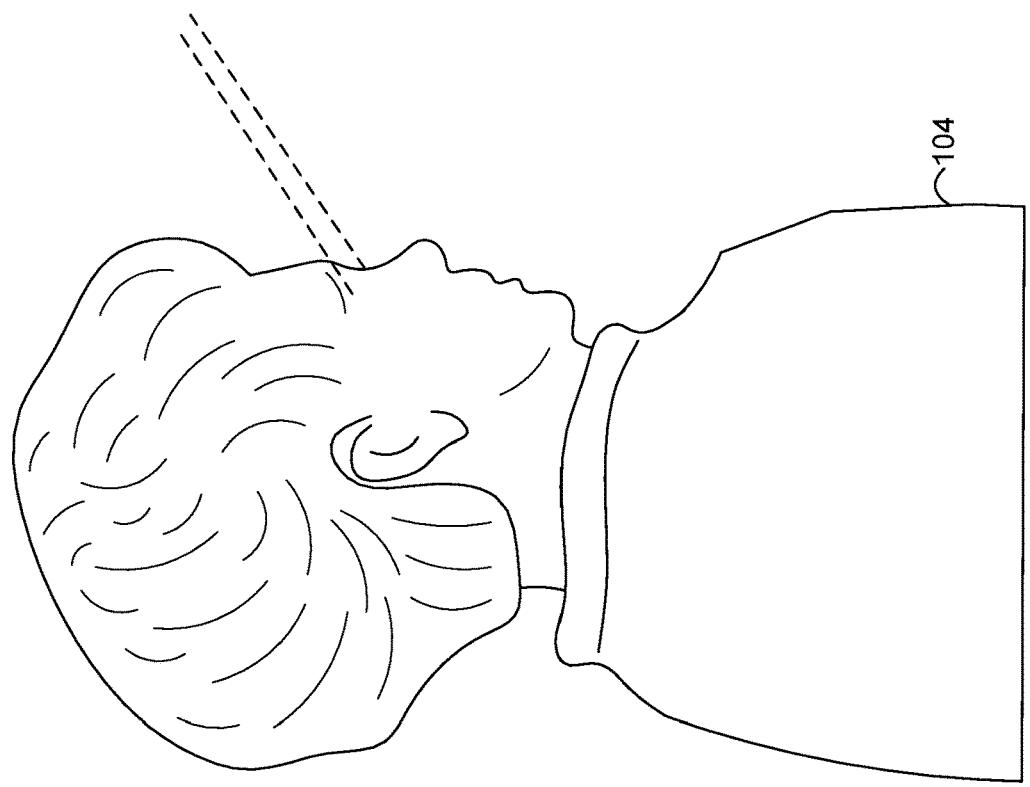
FIG. 1

FACE DETECTION CIRCUIT

BACKGROUND

Computing devices can operate in different power consumption states that have different associated levels of responsiveness and power consumption. For example, a computing device can be turned completely off so that the computing device does not draw power, but the computing device may need to go through a lengthy boot-up process before entering a higher power consumption state where the computing device is responsive to user commands. A computing device can also have intermediate power consumption states, e.g., a sleep or hibernate mode, where the computing device still draws some power but responds to the user more quickly than when turned completely off.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally applies to power consumption of computing devices. One example is a face detection circuit that includes a camera interface, a processing component, and a power management interface. The camera interface can be configured to communicate with a camera. The processing component can be configured to instruct the camera to provide image data at multiple levels of resolution, and perform multiple stages of analysis on the image data obtained from the camera to detect the presence of a face in the image data. The power management interface can be configured to output an indication when the face is detected in the image data.

Another example is a computing device that can include a processor, a camera, and a face detection circuit. The camera can be configured to capture image data. The face detection circuit can be configured to analyze the image data to detect the presence of a face. The face detection circuit can also be configured to output a signal that changes a power consumption state of the processor, responsive to detection of the face.

Another example is a method or technique that includes detecting a face in the vicinity of a computing device using a first circuit of the computing device that is powered by a first voltage domain. The method or technique also includes activating a second circuit of the computing device responsive to detecting the face, the second circuit being powered by a second voltage domain.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 1 and 2 collectively illustrate an exemplary use case, consistent with some implementations of the present concepts.

DETAILED DESCRIPTION

Overview

Figure 2:
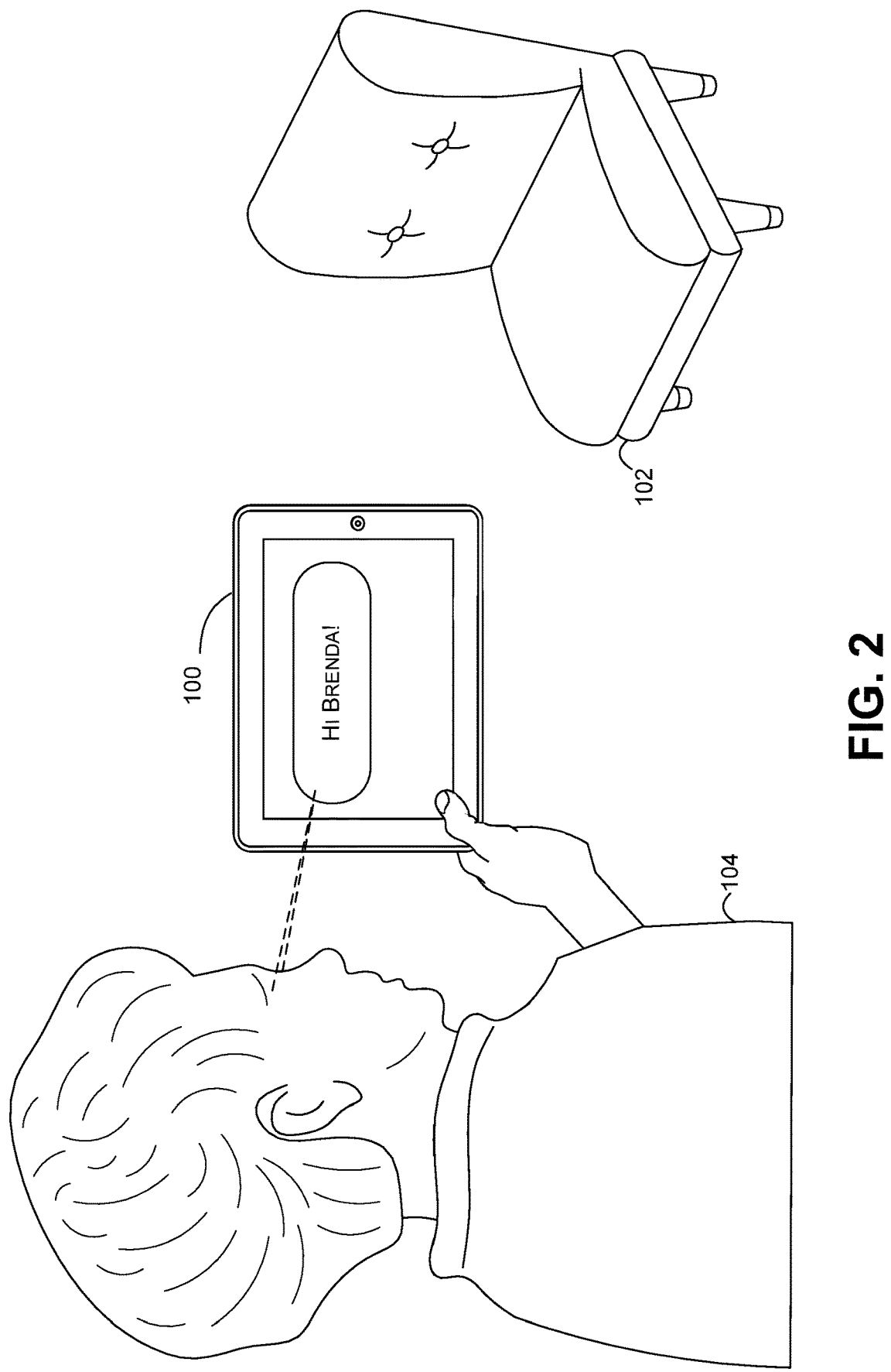

A computing device can generally operate in a relatively high power consumption state when the computing device is actively performing work. Under some circumstances, the computing device may enter a relatively low power consumption state where the power consumption of various components can be reduced. For example, a computing device might turn off or dim the display screen, configure the processing unit or memory to draw less power, etc. These actions can be taken during inactive periods when a user is not engaging the computing device. Then, the computing device can be activated at a later time to go back to the relatively high power consumption state when the user is ready to use the device.

One way to trigger the computing device to enter a high power consumption state is to use a button or other input mechanism where the user specifically instructs the computing device to enter the high power consumption state, e.g., to "wake up." Another approach is to use a sensor to detect user activity indicating that the user would like to use the computing device. For example, voice detection can be used to identify specific keywords that instruct the computing device to wake up. As another example, face detection can be used to detect that the user is looking at the computing device, which can indicate the user would like to use the computing device.

Considering face detection specifically, one way to detect a user's face is to execute sophisticated software algorithms on a processor, such as a central processing unit (CPU) or graphics processing unit (GPU). This "always on" approach involves maintaining the processing unit in a high power consumption state executing software instructions, reading from memory, etc. As a consequence, software-based face detection can involve relatively high power consumption.

In addition, software-based face detection may require a full secure boot to occur before the face detection can occur. In some cases, the central processing unit or graphics processing unit does not execute face detection code until after a secure boot from storage has been performed. Moreover, if the central processing unit or graphics processing unit is put to sleep, another full secure boot may be required. As a consequence, software-based face detection may exhibit relatively high latency from the user's perspective, because there is a delay while the secure boot occurs before the user's face is recognized and the computer becomes responsive to the user.

The disclosed implementations can utilize a face detection circuit configured with face detection logic to detect a user's face in proximity to the computing device. The face detection circuit can be powered by a separate voltage domain than other components of the computing device, such as the central processing unit and/or graphics processing unit. When the face detection circuit detects a face in the proximity of the computing device, the face detection circuit can cause the computing device to wake up by activating the central and/or graphics processing unit. Thus, the central and/or graphics processing unit can be powered down when the computing device is not being engaged by a user. As a consequence, the disclosed implementations may provide beneficial power consumption techniques because the central and/or graphics processing unit can operate in a reduced power state when no user is addressing the system.

In addition, some implementations may allow the face detection circuit to execute without going through a secure boot process until a face is detected. This may be acceptable because it is very unlikely that insecure code will execute on the face detection circuit. Once a face is detected, the secure boot process may occur on the central and/or graphics processing unit for further processing (e.g., user identification, log-in, etc.).

For the purpose of this document, the term "power consumption state" refers to the electrical consumption of a component. For example, an idle processing unit may draw a certain amount of electrical power in an idle state and draw increased power when actively performing a computing task. As another example, a processing unit that is in an idle state but receiving voltage may be placed into a relatively lower power state (e.g., a no-power state) by removing a voltage source from the processing unit.

References herein to a "high power consumption state" or a "low power consumption state" refer to relative changes in the power consumption state of a component, and are not intended to imply any designated value or range of power consumption. For example, a processing unit in an idle state and receiving voltage can be considered in a relatively high power consumption state compared to another power consumption state where the processing unit is not receiving voltage. On the other hand, a processing unit in an idle state might be considered in a relatively low power consumption state relative to a state where the processing unit is actively performing computing tasks.

Example Use Case

FIGS. 1 and 2 collectively illustrate a use case for the disclosed implementations. In FIG. 1, a computing device 100 is shown on a chair 102. A user 104 is near the computing device, but is not looking at the computing device. At this time, certain components of the computing device may be inactive, such as various processing units, memory, etc. However, as discussed more below, the computing device is still able to detect the user's face and that the user is not looking directly at the computing device.

In FIG. 2, the user 104 is shown having picked up the computing device and looking at the computing device 100. Here, the computing device has transitioned to a higher power consumption state by activating the computing device so that the computing device is ready to respond to user input. Thus, the user may be relieved of performing an explicit instruction to awaken the computing device.

Example Computing Device

Figure 3:
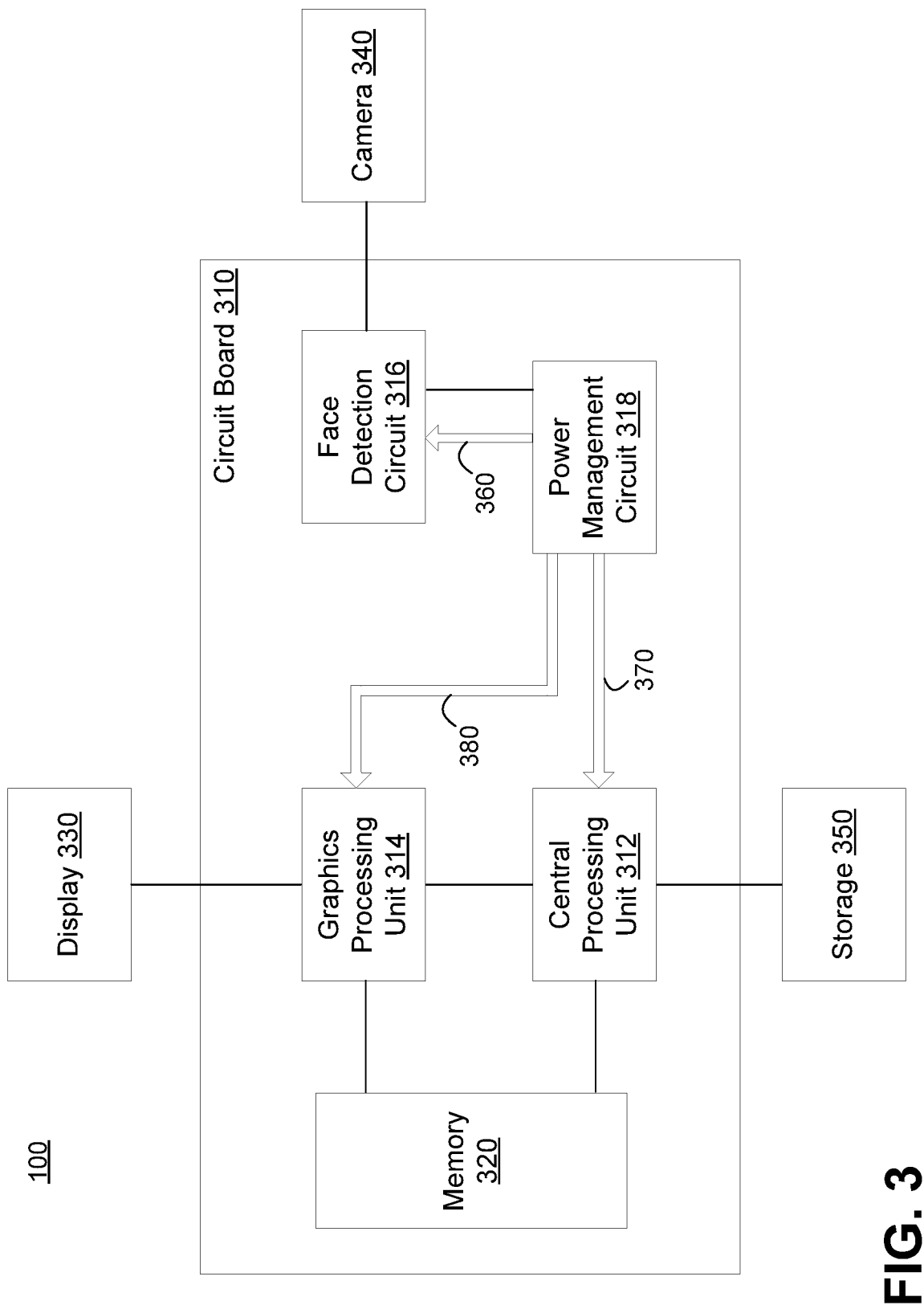
FIGS. 3 and 9 illustrate exemplary computing devices, consistent with some implementations of the present concepts.

The disclosed implementations can be performed on various types of computing devices, including mobile computing devices, laptop computers, desktop computers, wearable and/or augmented reality devices, televisions or other displays such as whiteboards, etc. FIG. 3 shows components of computing device 100, including a circuit board 310 with a central processing unit 312, graphics processing unit 314, face detection circuit 316, power management circuit 318, and a memory 320. Computing device 100 is also shown with a display 330, a camera 340, and storage 350.

Circuit board 310 is also shown with three separate voltage domains, 360, 370, and 380. Voltage domain 360 can be used to power face detection circuit 316, voltage domain 370 can be used to power central processing unit 312, and voltage domain 380 can be used to power graphics processing unit 314. Power management circuit 318 can control when each of the voltage domains is active by controlling one or more switches or voltage gates on the circuit board to which the power management circuit is electrically connected. For example, the power management circuit can place the central processing unit into a low power state by placing a corresponding switch or voltage gate that controls voltage domain 370 into a non-conducting state (e.g., opening the switch). Similarly, the power management circuit can place the central processing unit into a high power state by placing the switch or voltage gate controlling voltage domain 370 into a conducting state (e.g., closing the switch). Similar actions can be performed for switches or voltage gates that control voltage domains 360 and 380 to place the face detection circuit and graphics processing unit, respectively, into relatively high or low power states.

Generally, the different voltage domains can be electrically insulated from one another, e.g., using resistive material such as a silicon substrate of the circuit board 310. When a given voltage domain is inactive, the electrical components on that voltage domain can tend to use less power than would be the case by simply idling those components. For example, graphics processing unit 314 may have an idle setting where no work is performed and logic gates are not asserted or otherwise controlled, but the graphics processing unit still will use some power as a result of current leakage when voltage domain 380 is active. By turning off voltage domain 380, the power management circuit 318 can reduce or eliminate the current leakage from the graphics processing unit. As discussed more below, the power management circuit can activate the voltage domain 380 responsive to a signal from the face detection circuit 316. In a similar manner, the power management circuit can deactivate voltage domain 370 to reduce or eliminate current leakage from the central processing unit 312, and can activate the voltage domain 370 responsive to a signal from the face detection circuit 316.

In some cases, the different voltage domains have similar electrical characteristics. For example, the graphics processing unit 314, central processing unit 312, and/or face detection circuit 316 may each operate on 5.0 volts. In other cases, the different voltage domains have different electrical characteristics, e.g., the face detection circuit may operate on 3.3 volts instead of 5.0 volts. As long as the voltage domains can be separately controlled, the disclosed implementations can power the computing device 100 efficiently by deactivating certain voltage domains under certain conditions.

Note that FIG. 3 is a general example showing certain components of the computing device 100 and is neither comprehensive nor limiting. For example, the computing device may have various additional components not shown, e.g., a radio frequency modem, an audio signal processor, an infrared projector, additional processing units, cameras, or memories, etc. In addition, various buses may connect the different components to communicate with one another. The power management circuit 318 may activate any component of the computing device responsive to a signal from the face detection circuit 316.

Furthermore, different hardware architectures may be adopted, e.g., a camera, display, and/or storage controller may be provided on the same circuit board as components 312, 314, 316, 318, and 320 instead of separately as shown in FIG. 3. Likewise, components 312, 314, 316, 318, and 320 do not necessarily need to share a circuit board, e.g., power management circuit 318 or other components can be provided as external components instead.

Example Face Detection Circuit

Figure 4:
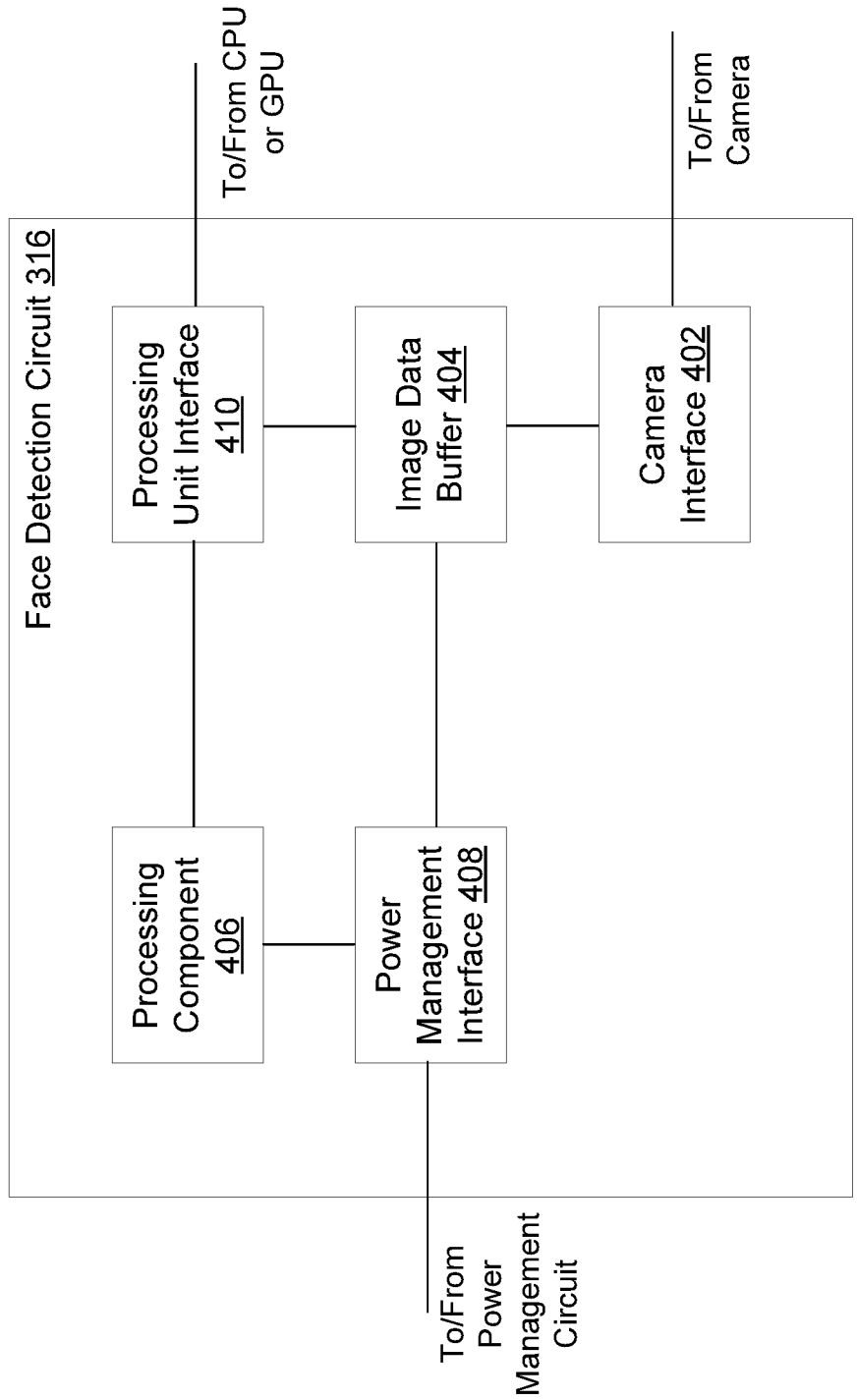
FIG. 4 illustrates an exemplary face detection circuit, consistent with some implementations of the present concepts.

FIG. 4 illustrates face detection circuit 316 in additional detail. Face detection circuit 316 can have a camera interface 402, an image data buffer 404, a processing component 406, and a power management interface 408. Generally, the term "processing component" is used herein to provide separate terminology for the logic implemented by the face detection circuit from that used for central processing unit 312 and graphics processing unit 314. However, as discussed more below, the processing component of the face detection circuit can also be implemented as a programmable processing unit similar to the central and/or graphics processing units.

Camera interface 402 can communicate with camera 340 to receive image data and/or send camera commands to the camera. For example, the commands can instruct the camera to operate at specific resolutions and/or frame rates. The camera interface can be implemented using various technologies such as an I²C bus, general purpose input/output (GPIO) using one or more input/output pins, etc. The image data received over camera interface 402 can be stored in an image data buffer 404, e.g., a volatile or non-volatile memory or cache provided on the face detection circuit 316.

Processing component 406 can instruct the camera 340 to provide image data at varying resolution levels by sending commands over camera interface 402. In addition, the processing component can perform one or more stages of analysis on the image data to detect a face. For example, the processing component can be implemented using hardware logic, such as an application-specific integrated circuit or field-programmable gate array. Alternatively, as discussed above, the processing component can be implemented using a general or special purpose processing unit that executes instructions (e.g., software logic). For example, the processing component can be implemented using a digital signal processor, microcontroller, or general-purpose processing unit.

Power management interface 408 can communicate with power management circuit 318 to indicate when a face has been detected. Power management interface 408 can be similar to camera interface 402, e.g., can be implemented using GIPO, I²C, or other technologies. The communications sent over the power management interface can be managed by the processing component 406.

Processing unit interface 410 can communicate with central processing unit 312 to obtain configuration settings for the face detection circuit 316. For example, as discussed more below, the central processing unit may instruct the face detection circuit to operate at different levels of accuracy, different levels of power consumption, etc. Processing unit interface 410 can be similar to camera interface 402 and/or power management interface 408, e.g., can be implemented using GIPO, I²C, or other technologies.

Example Operation Method

Figure 5:
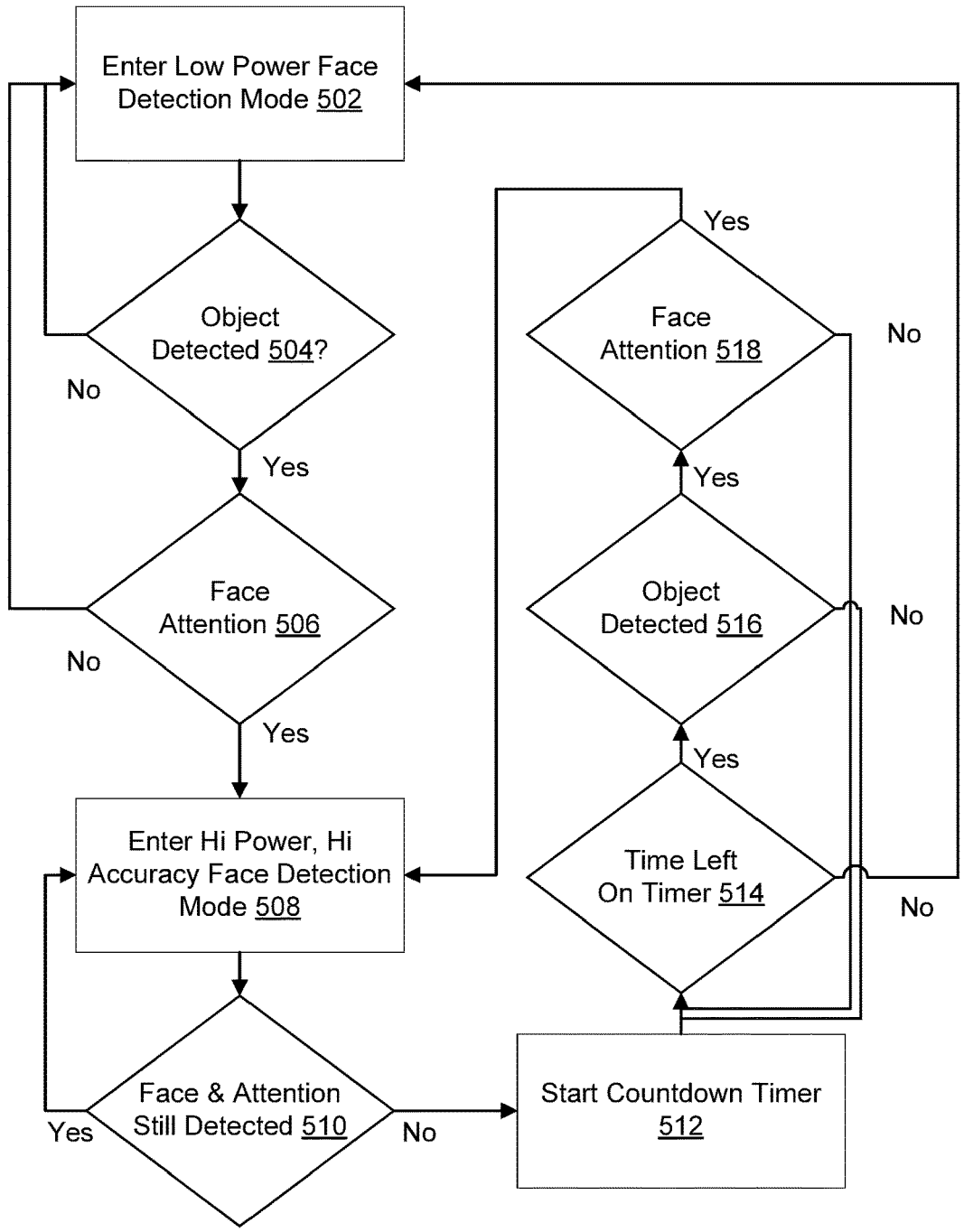
FIGS. 5 and 10 illustrate exemplary methods or techniques, consistent with some implementations of the present concepts.

FIG. 5 illustrates an exemplary method 500 consistent with the present concepts. This method can be implemented on the computing device 100, as discussed more below.

Method 500 begins at block 502, where the computing device 100 enters a low-power consumption face detection mode. In this mode, the power management circuit 318 can switch off voltage to the central processing unit 312, graphics processing unit 314, and/or other components of the computing device. In this mode, the power management circuit 318 can also supply power to the face detection circuit 316. Note that this is possible because the face detection circuit can be powered by a separate voltage domain from the central and/or graphics processing units, as discussed above.

Method 500 continues at block 504, where the face detection circuit 316 can check whether an object has appeared in front of the camera on the computing device 100. For example, the face detection circuit 316 can monitor changes to an image buffer obtained from the camera 340. If the image buffer exhibits a large enough change between two frames, the method moves to block 506. Otherwise, the method continues monitoring for changes indicating a new object has appeared in front of the camera.

In block 506, the face detection circuit 316 performs further processing to determine whether the object is a face and if so, whether the face is facing toward the camera (e.g., the user is paying attention to the computing device, etc.). If so, the method can move to block 508. Otherwise, the method can return to block 502 and continue monitoring for new objects.

In block 508, the computing device 100 enters a high power consumption mode. For example, the face detection circuit 316 can communicate a signal that causes other components of the computing device 100 to be activated. For example, the face detection circuit can signal the power management circuit 318 that a face has been detected. The power management circuit can activate the central processing unit 312, the graphics processing unit 314, and/or other components of the computing device.

Next, at block 510, the computing device 100 determines whether the face remains present and paying attention to the computing device. The computing device can do so by executing instructions (e.g., software logic) on central processing unit 312 and/or graphics processing unit 314. If the face remains present and paying attention to the computing device, the computing device remains in the high power consumption mode. If not, the computing device moves to block 512.

At block 512, the computing device 100 starts a countdown timer and moves to block 514.

At block 514, the computing device 100 checks whether time is remaining on the countdown timer. If there is remaining time on the countdown timer, the method moves to block 516 where the computing device 100 determines whether an object is detected in front of the computing device. If no object is detected, the method returns to 514 and checks for remaining time on the countdown timer.

If there is an object detected in block 516, the method moves to block 518, where the computing device determines whether the object is a face paying attention to the computing device 100. This can also be performed using instructions (e.g., software logic) executing on the central processing unit 312 and/or the graphics processing unit 314. If a face is detected paying attention to the computing device, the method returns to block 508 and remains in the high power mode, moves to block 510 to confirm the face is still paying attention, and, if not, starts a new countdown timer at block 512.

If block 518 determines that no face is paying attention to the computing device 100, the method returns to block 514 and checks for remaining time on the countdown timer.

If the countdown timer expires at block 514, the method returns to block 502 and the computing device 100 goes back into the low power consumption mode. For example, the central processing unit 312 can signal the power management circuit 318 when the time has expired. In response, the power management circuit 318 can turn off the voltage domain 370 and 380 to reduce power consumption by the central processing unit 312 and graphics processing unit 314. In addition, the power management circuit can activate the voltage domain 360 to provide voltage to the face detection circuit 316.

Generally speaking, different blocks of method 500 can be performed by different parts of computing device 100. For example, the power management circuit 318 can perform blocks 502 and 508 of method 500. As noted, block 502 can involve placing the computing device 100 in a low power state by activating the voltage domain 360 to provide power to the face detection circuit 316. Block 502 can also involve deactivating the voltage domain 370 to remove power from the central processing unit 312 and deactivating the voltage domain 380 to remove power from the graphics processing unit 314. As also noted, block 508 can involve activating voltage domains 370 and/or 380, and/or deactivating voltage domain 360.

The face detection circuit 316 can perform blocks 504 and 506 for face detection in the low power mode, e.g., while voltage domain 360 is active and voltage domains 370 and/or 380 are inactive. The central processing unit 312 and/or graphics processing unit 314 can perform blocks 510-518 for face detection in the high power mode, e.g., while voltage domains 370 and/or 380 are active and voltage domain 360 is inactive.

Taken as a whole, method 500 shows how different components of the computing device 100 can interact to remain in a high power consumption mode while a user remains facing the computing device, and return to a low power consumption mode where the face detection circuit 316 continues to monitor for faces addressing the computer. The countdown timer serves to prevent the computing device from instantly returning to the low power consumption mode if the user briefly looks away from the computing device. If the user looks away briefly and returns attention to the computing device, this is detected in blocks 516 and 518 and, as a consequence, a new countdown timer is started. If the user does not look at the computing device for a period of time that exceeds the duration of the countdown timer, the countdown timer can expire and the computing device returns to the low power consumption mode.

Camera Control

Using the face detection circuit 316 as discussed above can save power by deactivating other components of the computing device 100. In addition, the face detection circuit 316 can control the camera 340 in a power-efficient manner. For example, the face detection circuit can control various camera settings such as frame rate and/or resolution, as discussed more below.

For example, assume the camera 340 is a 4 k camera. For example, the camera can obtain images at a resolution of approximately 4000 pixels horizontally and/or vertically. Specific examples can include cameras with 4096×2160 resolution, 3840×2160 resolution, etc.

Figure 6:
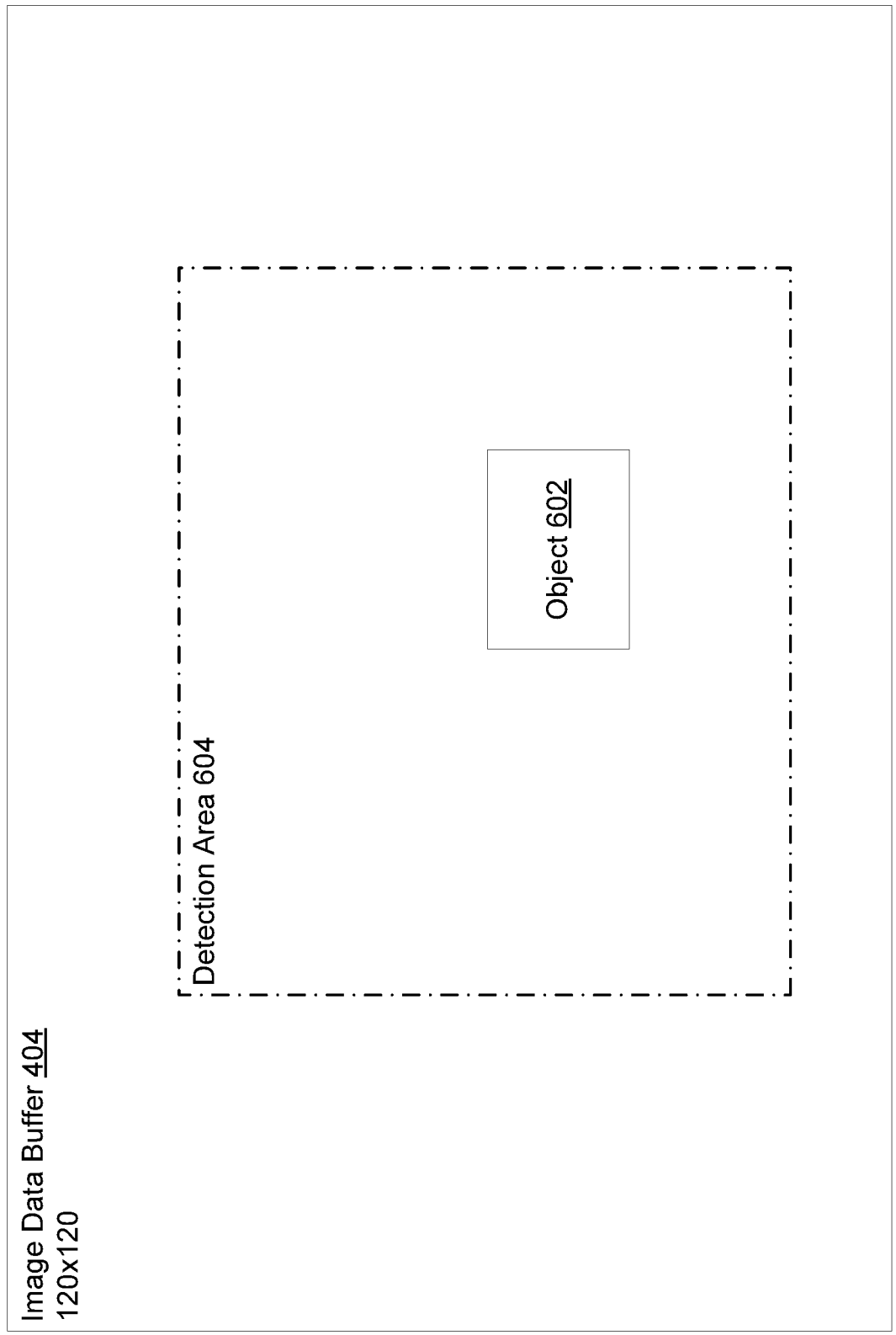
FIGS. 6-8 illustrate exemplary image data buffers, consistent with some implementations of the present concepts.

Generally speaking, detecting that a new object has appeared in front of the camera can be done at relatively low resolution. Thus, the face detection circuit 316 can perform block 504, detecting an object, by instructing the camera to operate at 120×120 pixels instead of 4 k resolution. FIG. 6 illustrates the contents of image data buffer 404 as obtained by the face detection circuit at this resolution. In this example, a new object 602 is present in the frame, which is sufficient to cause the face detection circuit to perform further processing (e.g., moving to block 506 of method 500). Note also that the object is present in a detection area 604, which is discussed in more detail below.

Figure 7:
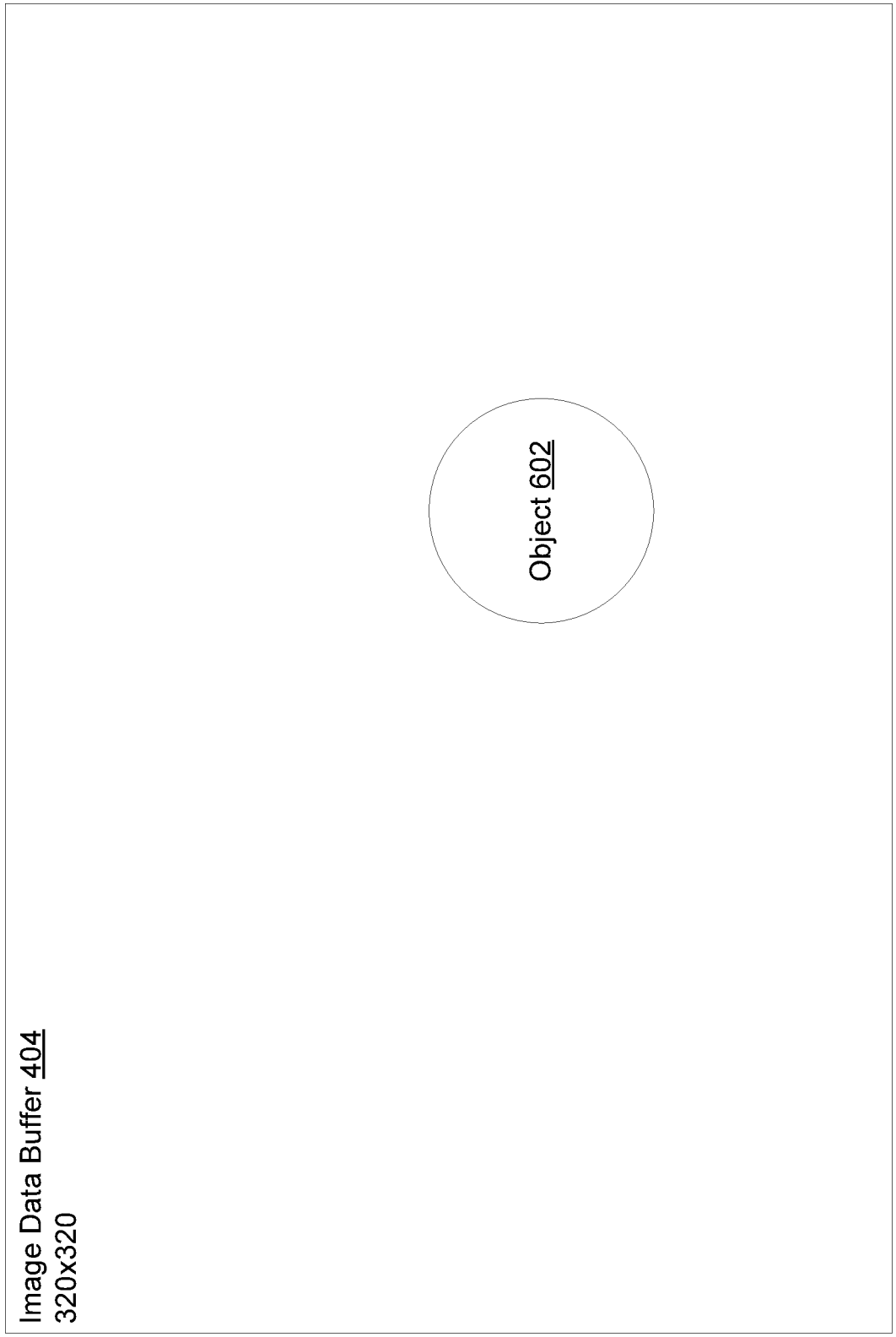

Once a new object is detected, the face detection circuit 316 can instruct the camera to increase resolution somewhat for further analysis. For example, the face detection circuit can instruct the camera to go to a 320×320 resolution, as shown in FIG. 7. At this point, the face detection circuit can discern additional details about object 602, e.g., that the shape is roughly the shape of a face. In addition, the face detection circuit can analyze the image data to determine the relative size of the object. If the face-shaped object exceeds a certain size, then it is likely that the face-shaped object is close enough to be paying attention to the computing device.

Figure 8:
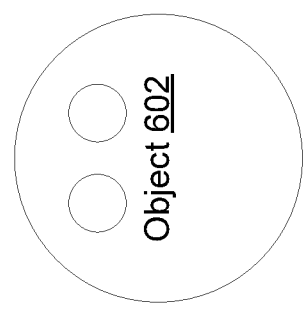

Next, the face detection circuit 316 can instruct the camera to increase resolution even further. For example, the face detection circuit can instruct the camera to go to a 640×640 resolution, as shown in FIG. 8. Here, the face detection circuit can look for features such as eyes that indicate the face-shaped object is actually facing the camera instead of looking away. If so, the face detection circuit can send a signal to power management circuit 318 indicating a face has been detected. At this point, the power management circuit can wake up any other components of the computing device 100 to be ready for the user. For example, the power management circuit can activate voltage domains 370 and/or 380, and/or can also deactivate voltage domain 360. In addition, the face detection circuit can also instruct the camera to go to full resolution and frame rate once the face has been detected. This will allow the camera to be active at full capabilities for use by the central processing unit 312 and/or graphics processing unit 314 when they are activated.

Algorithmic Details

The face detection circuit 316 can be configured to implement any number of different algorithms for detecting faces. For example, as noted above, the face detection circuit can perform block 504 of method 500 to determine whether an object is detected in the field of view of the camera. This can be implemented in any number of different ways. For example, the processing component 406 of the face detection circuit can take each frame provided by the camera 340 and determine the sum of absolute differences relative to the previous frame. This means that each pixel of the previous frame is subtracted from each pixel of the current frame, the absolute values of the differences between the pixels are determined, and then the absolute values of the differences are summed together to obtain a single value. This sum represents the relative extent to which the images have changed from frame to frame.

In some cases, the processing component 406 of the face detection circuit 316 can compare the sum of absolute differences to a frame difference threshold. If the frame difference threshold is exceeded, this implies that a new object is present in the frame (e.g., as shown in FIG. 6). Thus, the face detection circuit may do further processing (e.g., block 506 of method 500) to determine whether the object is a face that is paying attention to the computing device 100. In some cases, the frame difference threshold can help eliminate false positive detections for faces that exceed a certain distance from the computing device, e.g., a face that is very far from the computing device will consequently affect relatively few pixels. This is useful because a user very far from the computing device is less likely to be actually engaging the computing device, even if the user appears to be looking in the direction of the computing device.

Thresholds may also be employed at further stages of processing performed in the face detection analysis. For example, subsequent stages may output relative probabilities that the detected object is a face, that the face is paying attention to the computing device 100, etc. Some implementations may use probability thresholds to determine whether to signal the power management circuit 318 that a face has been detected. For example, given a 90% accuracy threshold, the face detection circuit 316 can output this signal whenever the face detection algorithm outputs a 90% or better probability that a face is currently paying attention to the computing device.

Some implementations may also constrain the field of view of the camera 340 to a certain area. For example, a user engaging the computing device 100 may tend to view the computing device relatively head-on as opposed to from the side. Thus, some implementations may only evaluate a portion of the area visible to the camera. Consider FIG. 6, which shows a detection area 604. Objects within detection area 604 may trigger the face detection circuit 316 to perform further analysis of the object, whereas objects outside the face detection area may be ignored for these purposes.

In some cases, the face detection circuit 316 may implement the detection area 604 by only requesting a specific subset of pixels encompassing the detection area from the camera 340. In other implementations, the face detection circuit may request the entire field of view of the camera but evaluate only the pixels within the detection area. For example, the face detection circuit can determine the sum of absolute differences of pixels within the detection area only, while ignoring pixels outside the detection area. Note also that the boundaries of the detection area effectively define a field of view of the face detection circuit, which can include both a horizontal field of view angle and a vertical field of view angle.

Another example of an algorithm that may be implemented by the face detection circuit 316 involves the use of Haar features. For example, edge features, line features, and/or center-surround features can be evaluated in one or more classifiers. In some cases, a cascaded sequence of classifiers can use different features for each classifier.

Each classifier may execute conditionally on a positive result by the previous classifier. For example, the first stage may involve new object detection using a frame difference threshold, as already discussed. If a new object is detected, a first stage of classification may be performed using a first classifier that evaluates a first type of Haar feature. If the first stage of classification passes, e.g., indicates the object is likely a face, a second stage of classification may be performed using a second classifier that evaluates a second type of Haar feature. Classifiers may be chained together in subsequent stages in a similar manner so that each stage executes when the previous stage is successful, and otherwise does not execute. As a consequence, unnecessary logic for subsequent stages is not executed when previous stages fail.

Battery/Plugged in Configuration Settings

In some implementations, face detection circuit 316 may have some configurable logic for various preferred settings. For example, consider the accuracy of face detection by the face detection circuit. If the face detection circuit tends to be over-inclusive, e.g., tends to incorrectly identify objects as faces, then the face detection circuit may tend to cause the central processing unit 312 and/or graphics processing unit 314 to wake up unnecessarily. On the other hand, if the face detection circuit tends to be under-inclusive, e.g., tends to misidentify faces as other objects, the user may perceive some latency because the face detection circuit may take several frames before correctly detecting the face and activating the central processing unit 312 and/or graphics processing unit 314.

In some implementations, the face detection circuit 316 can provide different accuracy settings based on whether the computing device 100 is currently plugged in or on battery power. If the computing device is plugged in, the face detection circuit might operate at a high level of accuracy by requesting higher resolution image data from the camera 340, requesting a higher frame rate from the camera, etc. In addition, the face detection circuit may use more over-inclusive thresholds for detecting faces. In contrast, when on battery power, the face detection circuit might operate at a lower level of accuracy by requesting relatively lower image resolution data from the camera, decreasing the requested frame rate, and/or using relatively under-inclusive thresholds for detecting faces.

The following presents some concrete examples for the sake of illustration. Assume that camera 340 is capable of 4 k resolution and providing 30 frames per second of image data. In some implementations, the face detection circuit 316 might use full-capability frame rate and resolution settings for each stage of face detection (e.g., 30 frames per second at 4$k$ resolution) when the computing device 100 is plugged in. Other implementations might use reduced-capability settings, e.g., 10 frames per second and 640×640 resolution for each stage of face detection when plugged in. When the computing device is not plugged in and instead being powered by the battery, the face detection circuit might use 1 frame per second and 640×640 resolution for each stage of face detection instead.

As previously noted, the face detection stages can use varying resolution when the computing device 100 is plugged in and/or when on battery power. When plugged in, assuming three face detection stages, the first stage might use 320×320 resolution, the second stage might use 640×640 resolution, and the third stage might use 1280×1280 resolution, perhaps at 15 frames per second for each stage. When on battery power, the first stage might use 120×120 resolution, the second stage might use 320×320 resolution, and the third stage might use 640×640 resolution, perhaps at 1 frame per second for each stage. Also, note that further implementations may use different vertical and horizontal resolutions at some or all of the face detection stages, e.g., 240×120 followed by 320×160 and so on.

In addition, the frame rates might vary when plugged in and/or when on battery power. Assume the computing device 100 is on battery power and the face detection circuit 316 has the camera 340 set at one frame per second. Once an object is detected (e.g., using the sum of absolute differences), it may be useful to immediately increase the frame rate (e.g., to 15 frames per second) so that subsequent stages of face detection may proceed quickly to reduce any latency perceived by the user. A similar approach with higher frame rates may be performed when the computing device is plugged in, e.g., 15 frames per second for the first stage and then increasing to 30 frames per second when a new object is detected.

Similarly, the algorithmic thresholds can be varied based on whether the computing device is currently plugged in. Because face detections can involve activating other components of the computing device 100, each face detection can cause the computing device to draw additional power. On the other hand, failing to detect a face that is actually addressing the computing device will result in perceived latency by the user.

Thus, it may be beneficial to use relatively under-inclusive settings when the computing device 100 is on battery power and relatively more over-inclusive settings when the computing device is plugged in. For example, the sum of absolute differences between two frames might need to vary more than a fixed frame difference threshold, perhaps 1024, when the computing device is on battery power, with a lower frame different threshold such as 512 when the computing device is plugged in. As a consequence, the face detection circuit 316 will have increased sensitivity to new objects when plugged in.

Subsequent stages of analysis can also have different probability thresholds depending on whether the computing device 100 is plugged in. For example, when the computing device 100 is on battery power, the face detection circuit 316 may use a probability threshold of 95% for face detection, and a lower probability threshold of 90% for face detection when the computing device is plugged in. As a consequence, the face detection circuit is more likely to determine that a face is paying attention to the computing device when the computing device is plugged in. When the computing device is on battery power, the face detection circuit is less sensitive to avoid incorrectly waking up the computing device and using battery power when the user is not addressing the computing device.

Additional Configuration Settings

In addition to using plugged-in vs. battery status, other criteria can be used to vary configuration settings of the face detection circuit 316. Generally, the camera resolution and frame rate as well as various algorithmic thresholds can be controlled based on these other criteria. The other criteria can include user settings, lighting conditions, machine learning, etc. The following provides some additional examples of how these criteria can be used.

First, consider lighting. In a dark room, it may be more difficult to detect new objects and/or discern facial features than would be the case in a room with adequate lighting. Thus, some implementations may use relatively more resource-intensive settings in relatively dark rooms. For example, increased resolution and/or frame rates can be used in dark rooms relative to settings used in relatively bright rooms. The relative darkness of the room can be detected either using the images provided by the camera 340 and/or using an ambient light sensor on the computing device 100. Moreover, because facial detection may be more difficult in dark rooms, relatively more inclusive thresholds may be used in the face detection algorithm. More specifically, a lower magnitude frame difference threshold may be used for detecting a new object and/or a lower probability threshold for detecting a new face may be employed in dark rooms.

Also, in some cases computing device 100 may be provided with an infrared illumination capability, and/or the camera 340 may have infrared imaging capability. In such cases, the face detection circuit 316 may activate the infrared illumination in relatively dark rooms. In addition, the face detection circuit may switch between using color (e.g., RGB) and infrared images for face detection processing based on ambient light in the setting. In other implementations, however, the face detection circuit may use infrared images regardless of how dark the room is. Note that relatively bright rooms may provide sufficient infrared energy to allow the infrared camera to capture detailed images without infrared illumination, so the use of infrared images does not necessarily involve the use of infrared illumination.

Furthermore, in some implementations the processing component 406 of the face detection circuit 316 may implement learning techniques over time. For example, the central processing unit 312 may be activated when the face detection circuit detects a face. The central processing unit may then perform further processing, e.g., a user log-in and/or face recognition. Generally, face recognition can include determining the identity of the user, whereas face detection can involve detecting the presence of a face without necessarily determining the identity of the user. In some cases, after being triggered by the face detection circuit, the central processing unit may be able to provide some indication of whether the face detection circuit has correctly detected the presence of a face. A user that continues to log-in to the computing device 100 and/or stand by for facial recognition to complete likely intended for the computing device to wake up, and the central processing unit can provide this information as positive feedback to the face detection circuit. On the other hand, if the central processing unit does not complete a user log-in and/or facial recognition, this suggests that the face detection was incorrect and this can constitute negative feedback to the face detection circuit.

The face detection circuit 316 can use the positive and negative feedback to adjust various settings. If there is a lot of negative feedback, say, 50% of activations do not result in a log-in or full face recognition, this suggests the face detection circuit should try to be more accurate. This can be accomplished in various ways, such as by increasing the resolution for one or more stages of the analysis and/or adjusting individual thresholds to be less inclusive (e.g., increasing the frame difference threshold and/or increasing a face detection probability threshold). If almost all of the feedback is positive, say, 99% of activations result in a log-in or full face recognition, this suggests that there may be times when faces are not detected and the face detection circuit can be more aggressive and either save power by lowering the resolution and/or accept some more false positives by adjusting individual algorithmic thresholds to be more inclusive (e.g., decreasing the frame difference and/or face probability threshold).

In addition, user input can configure the face detection circuit 316 to use specific settings. For example, the user 104 may place the computing device 100 into a power-saving mode, in which case the face detection circuit may use relatively lower resolution, slower frame rates, and/or less inclusive algorithmic thresholds. As another example, the user may adjust a target accuracy of the face detection circuit. For example, if the user specifies a target accuracy of 70%, the face detection circuit may adjust resolution settings and/or thresholds until the face detection circuit receives approximately 70% positive feedback. Generally speaking, the user-specified accuracy settings may be provided via the central processing unit 312 to the face detection circuit.

Cascaded Face Detection Circuits

Figure 9:
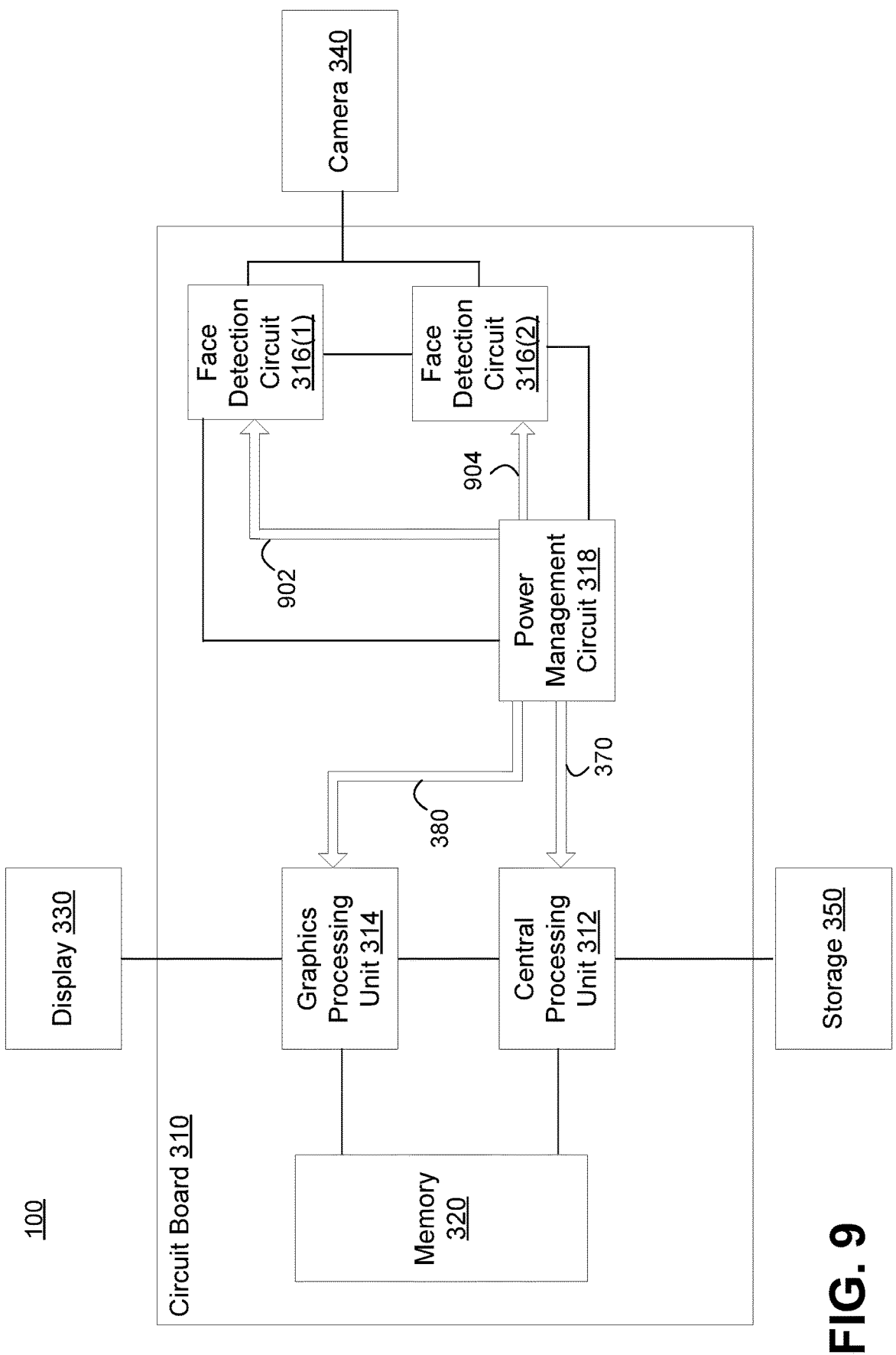

In some implementations, multiple stages of face detection may be performed on separate face detection circuits powered by separate voltage domains. FIG. 9 illustrates computing device 100 in a configuration with multiple cascaded face detection circuits, as discussed more below. Note that certain components of computing device 100 are retained from FIG. 1 and the accompanying description.

FIG. 9 shows computing device 100 with a first face detection circuit 316(1) powered by a first voltage domain 902, and a second face detection circuit 316(2) powered by a second voltage domain 904. Face detection circuit 316(1) can be configured to perform a first stage of face detection, e.g., detecting a new object as discussed herein. Face detection circuit 316(2) can be configured to perform one or more subsequent stages of face detection, e.g., determining whether the new object is a face that is paying attention to the computing device 100.

When a user is not actively using the computing device 100, the power management circuit 318 can deactivate voltage domains 370, 380, and 904, while leaving voltage domain 902 active. The face detection circuit 316(1) can remain operational and continually monitor for new objects in image data provided by the camera 340. When the face detection circuit 316(1) detects a new object, it can send a signal to the power management circuit indicating that a new object has been detected.

At this point, the power management circuit 318 can activate the voltage domain 904 while leaving voltage domains 370 and 380 inactive, and potentially also inactivating voltage domain 902. Then, the face detection circuit 316(2) can perform subsequent stages of analysis on the image data from the camera 340 to determine whether the new object detected by the face detection circuit 316(1) is a face that is addressing the computing device 100. Once a face addressing the computing device is detected, the face detection circuit 316(2) can inform the power management circuit 318, which can then proceed by activating voltage domains 370 and/or 380 as discussed above.

Recall, as described above, that power usage in a computing device can be caused by voltage leakage even in idle circuits. Consider FIG. 4 and assume a scenario where the computing device 100 goes 24 hours without a face addressing the computing device and where no new objects appear. Because the entire face detection algorithm is embodied on a single face detection circuit 316, there is some leakage by unused hardware logic on the face detection circuit that is never activated, e.g., the hardware logic that implements subsequent stages of the face detection algorithm.

Now, refer back to FIG. 9 and consider how providing separate stages of face detection on separate voltage domains can operate in a similar scenario. During the 24 hours when no objects are detected, the face detection circuit 316(2) is powered by an inactive voltage domain 904. As a consequence, the voltage leakage considerations discussed above are mitigated because the inactive face detection stages are on a separate voltage domain.

Note that FIG. 9 is merely exemplary and one or more additional cascaded face detection circuits may be employed. This may be a function of the specific overall face detection algorithm that is employed. For example, some face detection algorithms may employ a first face detection circuit that detects new objects, and use two additional face detection circuits to perform parallel processing when a new object is detected. In this case, the additional two face detection circuits may share a common voltage domain that is separate from the voltage domain of the first face detection circuit. As another example, three or more face detection circuits may be cascaded in a similar manner as already discussed, each face detection circuit activating a signal that causes the power management circuit 318 to activate the next face detection circuit in series until an affirmative output is provided indicating a face addressing the computing device has been detected. As still a further example, different cascaded face detection circuits may implement different classifiers that process different types of features, such as the Haar features mentioned above.

Additional Method Example

Figure 10:
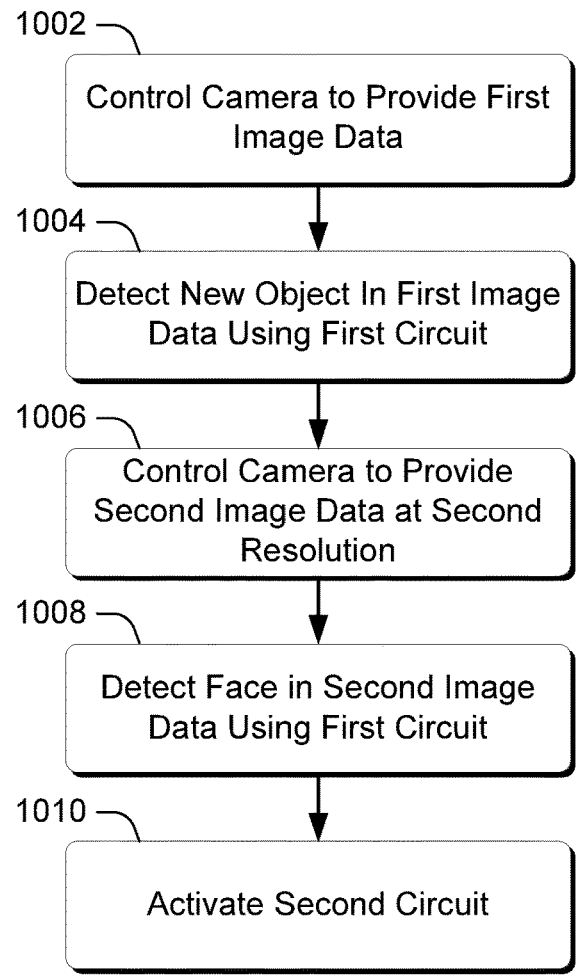

As discussed above, method 500 illustrates processing that can be performed by various components of computing device 100. FIG. 10 shows a method 1000 that illustrates processing from the perspective of face detection circuit 316.

Block 1002 of method 1000 can control camera 340 to provide first image data at a first resolution using a first circuit. For example, the face detection circuit 316 can control the camera to obtain two or more consecutive frames of image data at a specified resolution, as discussed above.

Block 1004 of method 1000 can detect a new object in the first image data using the first circuit of a computing device. For example, the face detection circuit 316 can detect the new object in a first stage of analysis by comparing the frames using a difference threshold.

Block 1006 of method 1000 can control camera 340 to provide second image data at a second resolution. For example, the face detection circuit 316 can control the camera to obtain one or more additional frames of image data at a relatively higher resolution than the first image data.

Block 1008 can detect a face in the second image data using the first circuit. For example, the face detection circuit 316 can use classifiers that obtain and process Haar features or other image processing algorithms to detect the face in one or more subsequent analysis stages. In some cases, block 1008 also determines whether the face is paying attention to the computing device 100.

Block 1010 can activate a second circuit when the face is detected and/or determined to be paying attention to the computing device 100. For example, the face detection circuit 316 can communicate a signal that causes the central processing unit 312 and/or graphics processor 314 to activate. As previously noted, the signal can be provided to power management circuit 318, which can manage separate voltage domains for the face detection circuit, the central processing unit, and/or the graphics processing unit.

Device Implementations

Referring back to FIG. 1, computing device 100 is shown in a tablet form factor. However, the disclosed implementations can be provided in any number of different types of computing devices, such as smartphones, tablets, laptops, desktops, etc. In addition, as mentioned, the disclosed implementations can be provided in wearable devices (e.g., a smart watch), augmented reality devices, etc. Other examples include computer-enabled home appliances, automobiles, whiteboards, televisions, etc. Generally, so long as a device has some computational hardware that can be activated in response to a user's face engaging the device, the disclosed implementations can be provided in such a device.

The term "device", "computer," "computing device," "client device," and/or "server device" as used herein can mean any type of device that has some amount of hardware processing capability and/or hardware storage/memory capability. Processing capability can be provided by one or more hardware processing units (e.g., hardware processing units/cores) that can execute computer-readable instructions to provide functionality. Example processing units shown herein include central processing unit 312 and/or graphics processing unit 314, shown in FIG. 3. Computer-readable instructions and/or data can be stored on storage, such as memory 320 and/or storage 350.

Storage 350 can be internal or external to the computing device 100. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose processing unit and storage/memory. In other cases, a device can include a system on a chip (SOC) type design. In SOC design implementations, functionality provided by the device can be integrated on a single SOC or multiple coupled SOCs. One or more associated processing units can be configured to coordinate with shared resources, such as memory, storage, etc., and/or one or more dedicated resources, such as hardware blocks configured to perform certain specific functionality. Thus, the term "processor" or "processing component" as used herein can also refer to central processing units (CPUs), graphical processing units (GPUs), controllers, microcontrollers, processor cores, or other types of processing devices suitable for implementation both in conventional computing architectures as well as SOC designs.

As already discussed, the face detection circuit 316 can be implemented as various types of hardware. More generally, any of the components of computing device 100 and/or the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Also note that computing device 100 generally can have input and/or output functionality. For example, computing devices can have various input mechanisms such as keyboards, mice, touchpads, voice recognition (e.g., via a microphone), gesture recognition (e.g., using depth cameras such as stereoscopic or time-of-flight camera systems, infrared camera systems, RGB camera systems, or using accelerometers/gyroscopes, facial recognition, etc.). Devices can also have various output mechanisms such as printers, monitors, speakers, etc.

Additional Examples

Various device examples are described above. Additional examples are described below. One example includes a face detection circuit comprising a camera interface configured to communicate with a camera, and further comprising a processing component configured to instruct the camera to provide image data at multiple levels of resolution and perform multiple stages of analysis on the image data obtained from the camera to detect the presence of a face in the image data. The face detection circuit further comprises a power management interface configured to output an indication when the face is detected in the image data.

Another example can include any of the above and/or below examples where the processing component is embodied as hardware logic.

Another example can include any of the above and/or below examples where the hardware logic of the processing component comprises an application-specific integrated circuit.

Another example can include any of the above and/or below examples where the processing component is embodied as a programmable processor configured via executable instructions.

Another example can include any of the above and/or below examples where the programmable processor is a microcontroller or a digital signal processor.

Another example can include any of the above and/or below examples where the processing component is configured to perform a first stage of analysis on first image data provided by the camera at a first level of resolution that is less than a maximum resolution of the camera. The processing component is further configured to perform a second stage of analysis on second image data provided by the camera at a second level of resolution that is greater than the first level of resolution and less than the maximum resolution of the camera.

Another example can include any of the above and/or below examples where the processing component is further configured to perform a first stage of the analysis to detect a new object in the image data. Provided the new object is detected in the image data, the processing component will continue with one or more additional stages of analysis to determine whether the new object is a face addressing the computing device. When the new object is not detected in the image data, the processing component will not perform the one or more additional stages of analysis.

Another example includes a computing device comprising a processing unit, a camera configured to capture image data, and a face detection circuit. The face detection circuit is configured to analyze the image data to detect the presence of a face. Responsive to detection of the face, the face detection circuit will output a signal that changes a power consumption state of the processing unit.

Another example can include any of the above and/or below examples where the signal changes the power consumption state of the processing unit from a relatively low power consumption state to a relatively high power consumption state.

Another example can include any of the above and/or below examples where the processing unit is a central processing unit or a graphical processing unit.

Another example can include any of the above and/or below examples where the computing devise further comprises a power management circuit configured to receive the signal from the face detection circuit and place the processing unit into a relatively high power consumption state responsive to receiving the signal.

Another example can include any of the above and/or below examples where the processing unit is configured to output an indication to the power management circuit that the face is no longer detected, and the power management circuit is configured to place the processing unit in the low power consumption state responsive to the indication that the face is no longer detected.

Another example can include any of the above and/or below examples where the power management circuit is electrically connected to a switch or voltage gate that controls application of electrical power to the processing unit. The power management circuit is further configured to place the processing unit into the low power consumption state by placing the switch or the voltage gate into a non-conducting state.

Another example can include any of the above and/or below examples where the power management circuit is configured to activate the face detection circuit responsive to the indication from the processing unit that the face is no longer detected.

Another example can include any of the above and/or below examples where the face detection circuit is at least one of a programmable microcontroller, a programmable digital signal processor, or an application-specific integrated circuit.

Another example can include any of the above and/or below examples where the computing device is embodied as a mobile phone or tablet.

Another example can include a method comprising the detecting of a face in the vicinity of a computing device using a first circuit of the computing device that is powered by a first voltage domain. The method further activates a second circuit of the computing device responsive to detecting the face, the second circuit being powered by a second voltage domain.

Another example can include any of the above and/or below examples where the method further comprises controlling a camera of the computing device to obtain image data and analyzing the image data to detect the face.

Another example can include any of the above and/or below examples where the analyzing comprises at least two different analysis stages.

Another example can include any of the above and/or below examples where the method further comprises controlling the camera to obtain at least two different image resolutions for the at least two different analysis stages.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims, and other features and acts that would be recognized by one skilled in the art are intended to be within the scope of the claims.

The invention claimed is:

1. A face detection circuit comprising:
   a camera interface configured to communicate with a separate camera that is external from the face detection circuit;
   a local image data buffer configured to store image data obtained from the separate camera;
   a processing component configured to:
      send one or more instructions over the camera interface to the separate camera to provide the image data at multiple levels of resolution, and
      perform multiple stages of analysis on the image data in the local image data buffer to detect the presence of a face in the image data; and
   a power management interface configured to output an indication to a separate power management circuit when the face is detected in the image data.

2. The face detection circuit of claim 1, wherein the processing component is embodied as hardware logic.

3. The face detection circuit of claim 2, wherein the hardware logic of the processing component comprises an application-specific integrated circuit.

4. The face detection circuit of claim 1, wherein the processing component is embodied as a programmable processor configured via executable instructions.

5. The face detection circuit of claim 4, wherein the programmable processor is a microcontroller or a digital signal processor.

6. The face detection circuit of claim 1, wherein the processing component is configured to:
   perform a first stage of analysis on first image data provided by the separate camera at a first level of resolution that is less than a maximum resolution of the separate camera; and
   perform a second stage of analysis on second image data provided by the separate camera at a second level of resolution that is greater than the first level of resolution and less than the maximum resolution of the separate camera.

7. The face detection circuit of claim 1, wherein the processing component is further configured to:
   perform a first stage of the analysis to detect a new object in the image data;
   determine whether to perform subsequent analysis based at least on whether the new object is detected in the image data;
   provided the new object is detected in the image data, continue with one or more additional stages of analysis to determine whether the new object is a face addressing a computing device comprising the face detection circuit; and
   when the new object is not detected in the image data, not perform the one or more additional stages of analysis.

8. A computing device comprising:
   a processing unit powered by a first voltage domain;
   a camera configured to capture image data; and
   a face detection circuit powered by a second voltage domain that is electrically insulated from the first voltage domain, the face detection circuit being configured to:
      analyze the image data to detect the presence of a face; and
      responsive to detection of the face, output a signal that changes a power consumption state of the processing unit.

9. The computing device of claim 8, wherein the signal changes the power consumption state of the processing unit from a relatively low power consumption state to a relatively high power consumption state.

10. The computing device of claim 9, wherein the processing unit is a central processing unit or a graphical processing unit.

11. The computing device of claim 10, further comprising:
    a power management circuit configured to:
       receive the signal from the face detection circuit; and
       place the processing unit into the relatively high power consumption state responsive to receiving the signal.

12. The computing device of claim 11, wherein:
    the processing unit is configured to output another signal to the power management circuit, the another signal indicating that the face is no longer detected, and
    the power management circuit is configured to place the processing unit in the relatively low power consumption state responsive to the another signal indicating that the face is no longer detected.

13. The computing device of claim 12, the power management circuit being electrically connected to a switch or voltage gate that controls application of electrical power to the processing unit and being configured to place the processing unit into the relatively low power consumption state by placing the switch or the voltage gate into a non-conducting state responsive to receiving the another signal from the processing unit indicating that the face is no longer detected.

14. The computing device of claim 12, wherein the power management circuit is configured to:
activate the second voltage domain that powers the face detection circuit responsive to receiving the another signal from the processing unit indicating that the face is no longer detected.

15. The computing device of claim 8, wherein the face detection circuit is at least one of a programmable microcontroller, a programmable digital signal processor, or an application-specific integrated circuit.

16. The computing device of claim 8, embodied as a mobile phone or tablet.

17. A method comprising:
detecting a face in the vicinity of a computing device using a first circuit of the computing device that is powered by a first voltage domain; and
activating a second circuit of the computing device responsive to detecting the face, the second circuit being powered by a second voltage domain that is electrically insulated from the first voltage domain.

18. The method of claim 17, further comprising:
controlling a camera of the computing device to obtain image data; and
analyzing the image data to detect the face.

19. The method of claim 18, wherein the analyzing comprises at least two different analysis stages.

20. The method of claim 19, further comprising:
controlling the camera to obtain at least two different image resolutions for the at least two different analysis stages.

21. The method of claim 17, wherein the second circuit comprises a processor, and activating the processor comprises causing the processor to perform a secure boot of the computing device responsive to detecting the face in the vicinity of the computing device.

22. The computing device of claim 8, further comprising a resistive material that electrically insulates the first voltage domain that powers the processing unit from the second voltage domain that powers the face detection circuit.

23. The face detection circuit of claim 1, wherein the processing component of the face detection circuit is configured to detect the presence of the face independently without involvement of a separate processing unit.

* * * * *